(12) United States Patent
Iwamoto

(10) Patent No.: US 6,286,223 B1
(45) Date of Patent: Sep. 11, 2001

(54) APPARATUS AND METHOD OF MEASURING OUTER DIAMETER OF WORKED PORTION AT PIPE END

(75) Inventor: Michihiko Iwamoto, Wakayama (JP)

(73) Assignee: Sumitomo Metal Industries, Ltd., Osaka (JP)

( * ) Notice: Subject to any disclaimer, the term of this patent is extended or adjusted under 35 U.S.C. 154(b) by 0 days.

(21) Appl. No.: 09/542,948

(22) Filed: Apr. 4, 2000

Related U.S. Application Data

(63) Continuation of application No. PCT/JP98/03495, filed on Aug. 5, 1998.

(30) Foreign Application Priority Data

Jan. 31, 1997 (JP) .............................. 08536/1997

(51) Int. Cl.$^7$ .............................. G01B 3/00; G01B 3/38
(52) U.S. Cl. ...................................... 33/555.1; 33/555.3
(58) Field of Search .............................. 33/555.1, 555.3, 33/783, 549, 550, 555, DIG. 2

(56) References Cited

U.S. PATENT DOCUMENTS

| | | | |
|---|---|---|---|
| 2,696,675 | * 12/1954 | Case | 33/555.1 |
| 3,879,993 | * 4/1975 | Sorbie | 33/550 |
| 4,596,076 | * 6/1986 | Sigg | 33/555.1 |
| 4,958,442 | * 9/1990 | Eckhardt | 33/550 |
| 5,024,002 | * 6/1991 | Possati | 33/550 |
| 5,044,088 | * 9/1991 | Peucker | 33/550 |
| 5,359,784 | * 11/1994 | Tomida | 33/550 |

OTHER PUBLICATIONS

JP, 50–110656, A (K.K. Mitoyo Seisakusho), "A Continuous Outer Diameter Measuring Apparatus", Aug. 30, 1975.
JP, 6–56705, A (Mitsubishi Heavy Industries, Ltd.), "Apparatus for Measuring Outer Diameter of Coil", Aug. 05, 1994.
JP, 8–122049, A (K.K. Kyowa Kikai Seisakusho), "Diameter Measuring Instrument", May 17, 1996.
JP, 62–184307, A (Iijima Seimitsu Kogyo K.K.), "Dimension Measuring Instrument for Cylindrical Object", Aug. 12, 1987.
JP, 9–304046, A (Sekisui Chemical Co., Ltd.), "Method for Measuring Outer Diameter of Tube", Nov. 28, 1997.

* cited by examiner

Primary Examiner—Randy W. Gibson
(74) Attorney, Agent, or Firm—Burns, Doane, Swecker & Mathis, LLP

(57) ABSTRACT

An apparatus and a method are provided for rapidly and precisely measuring an outer diameter of a pipe end portion of various sizes of pipes. This apparatus includes a main arm (1), a lower gauge head support arm (2), a bearing roller arm (3), an upper gauge head supporting arm (4), a presser roller arm (5), an position-fixing bracket (6), a gage head (14*b*) which is horizontally and vertically movable while being supported by the arm (2), and a gauge head (15*b*) which is also horizontally and vertically movable while being supported by the arm (4). In addition, A gauge heads (14*a*) and (15*a*) are provided, both of which are vertically movable.

An object is measured in its outer diameter by the gauge heads while being rotatably held by rollers (10*a*, 10*b*, 11*a* and 11*b*) of the arm (3) and (5). Such a measurement can simultaneously be carried out at two longitudinal portions of the measured object.

11 Claims, 5 Drawing Sheets

APPARATUS AND METHOD OF MEASURING OUTER DIAMETER OF WORKED PORTION AT PIPE END

This application is a continuation, of Application No. PCT/JP98/03495 filed in JAPAN on Aug. 5, 1998, and which designated the U.S.A.

TECHNICAL FIELD

The present invention relates to an apparatus for measuring the outer diameter of a worked portion at the end of a pipe end, and a method thereof. The pipe, for example, is an oil well pipe. A thread for coupling is formed at an end portion of the oil well pipe. The apparatus and the method of the present invention are suitable for measuring the outer diameter dimension after a thread working is applied.

BACKGROUND ART

FIG. 5 is a sectional view showing a typical example of a method for joining oil well pipes. FIG.5(a) shows one type in which two pipes $P_1$ and $P_2$ are jointed to each other by use of a coupler C. In this type, a thread portion S, having a mail thread, is provided around each outer peripheral surface of the ends of the two pipes $P_1$ and $P_2$. The two pipes are joined together by screwing the male thread into the mating female thread provided around an inner peripheral surface of the coupler C. In the type shown in FIG.5 (b), a female thread is provided around an inner peripheral surface of one pipe $P_2$, which is joined to another pipe $P_1$ by screwing the female thread into the mating male thread provided around an outer peripheral surface of the another pipe $P_1$.

In the types shown in FIG. 5, some pipes have a portion M (referred as a metal seal portion) corresponding to an end portion of the pipe to which no thread working is applied. There also exists a type, which has no such metal seal portion, but it is not shown in the drawing.

As described above, a thread working is applied to at least one of the outer peripheral surface of the end portions of the oil well pipes. Such a thread requires durability against repeated use, and a portion which is joined by the thread, also requires high air tightness. Thus, in an oil well pipe which has the thread worked portion with or without the metal seal portion, it is highly important to verify whether the worked portion of a pipe edge, including these portions, is ranged within a particular standardized dimension.

To cite an example for verification of the oil well pipe edge portion worked as shown in FIG. 5, there is one measurement method, in which the outer diameter, at a position of 2 mm from the pipe edge (the metal seal portion), is measured and the outer diameter, at one particular portion in the range of from 30 to 80 mm from the same pipe edge (the thread portion), is measured. The position in the latter measurement is varied according to a size of an oil well pipe. In the conventional method, when the outer diameter is measured at such plural designated positions, stand off ring gauges, which have respectively different diameters corresponding to each prescribed outer diameter at the plural designated positions, have been prepared for each the pipe size. However, this conventional method has the following enumerated drawbacks.

(1) A number of gauges need to be prepared for each pipe size and also for each measuring position. Therefore, the expenditure for their fabrication would run up and this also takes a lot of trouble due to the checking operation for quality control of the gauges.

(2) Since it needs to perform the measurement with fitting the gauge onto the measuring position from the outside, this occasionally causes to make some defects on the peripheral of the pipe.

(3) In a case that the thread worked portion is out of the complete round, the measurement error would be increased.

There also exists a method for directly measuring the outer diameter dimension of the designated portion besides the aforementioned method. However, such a method has the following drawbacks.

(4) Since the maximum size of the outer diameter is measured by making a reference portion of the gauge contact at the pipe end, it needs to turn the gauge around with making the reference portion serve as a fulcrum. Accordingly, the measurement attitude could become unstable, and this tends to cause measurement error.

(5) Since the outer diameter of the designated portion is measured at several points and these sizes are visually read, a continuous and rapid measurement cannot be carried out.

(6) Since plural designated portions need to be measured with respective particular gauges, the designated portions cannot simultaneously be measured.

As described above, any conventional measuring methods are inefficiently performed by manual procedures, and it is also difficult to measure with high accuracy.

DISCLOSURE OF INVENTION

One object of the present invention is to provide an apparatus for measuring an outer diameter of the worked portion at the end of a pipe, which has all of the following functions:

(a) Enabling to measure an outer diameter of various pipes having different sizes.

(b) Enabling to simultaneously measure both of the outer diameters of two circumferential portions of the end portion of the pipe.

(c) Enabling to pick up the measurement result in the form of an electric signal and process the signal by an arithmetic unit to automatically calculate the outer diameters.

(d) Enabling to continuously measure with high accuracy at plural circumferential positions of the pipe.

A second object of the present invention is to provide a method for rapidly and accurately measuring an outer diameter of the worked portion at the end of a pipe by use of the aforementioned apparatus.

The apparatus of the present invention is an apparatus for measuring an outer diameter of a worked portion at the end of a pipe, as illustratively showed in FIG. 1 to FIG. 4. Major members of this apparatus are a main arm 1, a lower gauge head support arm 2, a bearing roller arm 3, an upper gauge head support arm 4, a presser roller arm 5, a position-fixing bracket 6, lower gauge heads 14a and 14b, and upper gauge heads 15a and 15b.

The lower gauge head support arm 2 and the bearing roller arm 3 are locked to the lower end of the main arm 1 while projecting at a right angle, i.e. toward a horizontal direction, with respect to the main arm 1. In the same way, the upper gauge head support arm 4 and the presser roller arm 5 are disposed to project at a right angle with respect to the main arm 1. Hereat, the arm 4 and 5 can vertically slide along the main arm 1.

The upper gauge head support arm 4 is locked in a predetermined position (predetermined height) of the main arm 1 through clamping down with screws 16a and 16b. In the same way, the position-fixing bracket 6 is locked in a predetermined position or predetermined height of the main arm 1 through clamping down with screws 17a and 17b. This position-fixing bracket 6 makes a junction with the presser roller arm 5 through pins 18a and 18b and coil springs 19a and 19b.

The lower gauge head 14b and the upper gauge head 15b are inserted respectively into the groove 2b of the arm 2 and the groove 4b of the arm 4, and each gauge head is movable toward the main arm 1 along the respective grooves. The gauge heads 14a and 15a may be secured at a predetermined position not able to move in a horizontal direction, and may otherwise be moveable toward the main arm 1, along a groove 2b and a groove 4b respectively, as well as the gauge heads 14b and 15b. All of these gauge heads can be vertically moved, i.e., can be moved toward a peripheral surface of a measured object, and it is adapted so that such movement distance can be detected in the form of an electric signal.

The bearing roller arm 3 is formed in a U-shape as shown in figures, and rollers 10a and 10b are rotatably attached to both sides 3b of the bearing roller arm. The presser roller arm 5 has a similar structure in which rollers 11a and 11b are provided. A pipe, as the measured object, is supported with being clipped between these rollers. Thus the outer diameter can be measured at two portions of the pipe in its axial direction (longitudinal direction), by the aforementioned gauge heads.

Further details about the apparatus and the measuring method will be described hereinafter.

BEST MODE FOR EMBODYING THE INVENTION

Hereinafter, the measuring apparatus and the measuring method of the present invention will be described in detail with reference to the drawings showing their best mode.

1. The Apparatus of the Present Invention

Figure 1:
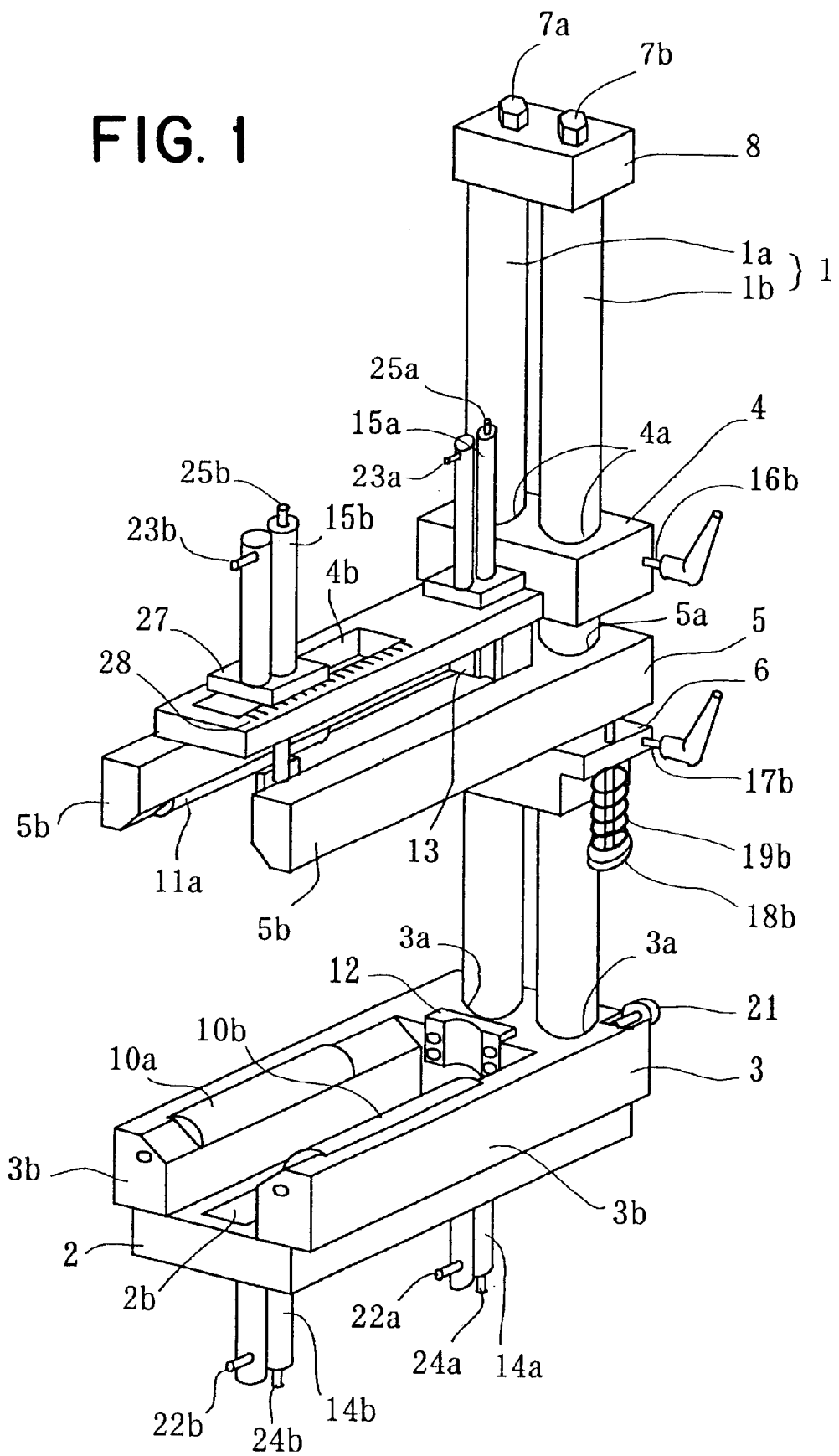
FIG. 1 is a perspective view showing one example of the measuring apparatus according to the present invention.

In FIG. 1, a main arm 1, for example, comprises two parallel shafts 1a and 1b whose upper ends are secured to a fixing bracket 8 by bolts 7a and 7b respectively. A lower gauge head support arm 2 and a bearing roller arm 3 are disposed in a horizontal position at the lower end portion of this main arm 1, that is, both arms 2 and 3 and the main arm 1 are orthogonally arranged.

An upper gauge head support arm 4, a presser roller arm 5 and a position-fixing bracket 6 are located at an upper side of the main arm 1. These are mounted on the shaft 1a and 1b in parallel with the lower gauge head support arm 2 and the bearing roller arm 3, and are slidably guided on the shaft 1a and 1b.

The bearing roller arm 3 and the presser roller arm 5 are formed in a U-shape respectively having two sides 3b and 5b. Penetrated apertures 3a and 5a, through which the shafts 1a and 1b of the main arm 1 are respectively passed, are provided at the connecting portions of the two sides 3b and 5b. Bearing rollers 10a and 10b, and presser rollers 11a and 11b (cf. FIG. 2), which respectively contact to an outer peripheral surface of a measured object (pipe) 9, are rotatably attached to respective opposite surfaces of these arms 3b, 5b.

Reference to pieces 12 and 13, which contact to one end of the measured object 9, are attached respectively to vertical surfaces of the arms 3 and 4, which are positioned to close to main arm 1.

Figure 4A:
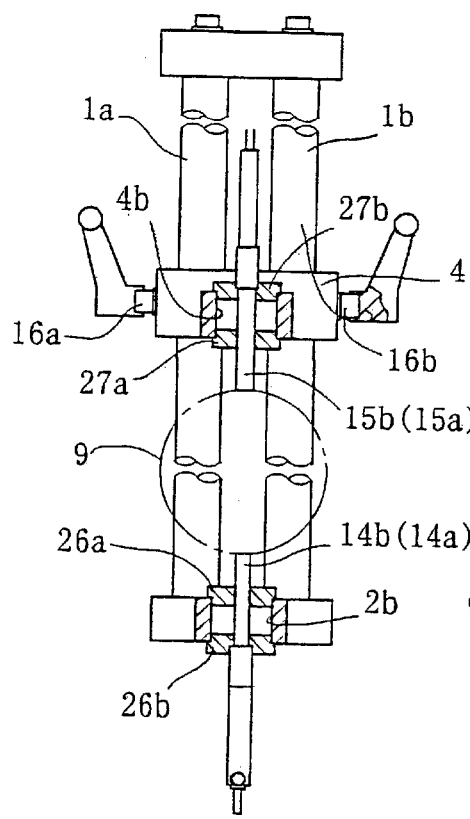
FIG. 4 is an illustrative drawing of a measuring mechanism according to the present invention. FIG. (a) is a front view, FIG. (b) is a side view, and a sectional view taken along line C—C is presented in FIG. (c).
Figure 4B:
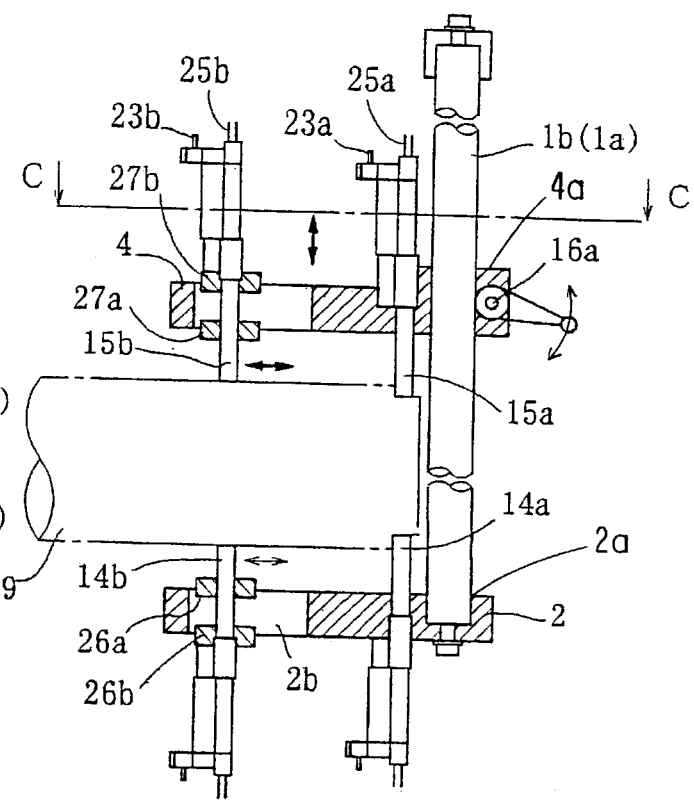

The lower gauge head support arm 2 and the upper gauge head support arm 4 also have intrusion apertures 2a (cf. FIG. 4(b)) and penetrated apertures 4a for the shaft 1a and 1b, comprising the main arm 1. A pair of gauge heads 14a and 14b, and the other pair of gauge heads 15a and 15b are installed in these arms. Among these gauge heads, the gauge heads 14a and 15a may be secured at a predetermined position (e.g., the position of 2 mm from an end portion of a pipe to be measured) and may otherwise be movable. The gauge heads 14b and 15b are adapted to be moved back and forth with respect to reference pieces 12 and 13, along the grooves 2b and 4b provided in the bearing roller arm 3 and the upper gauge head support arm 4.

Figure 2A:
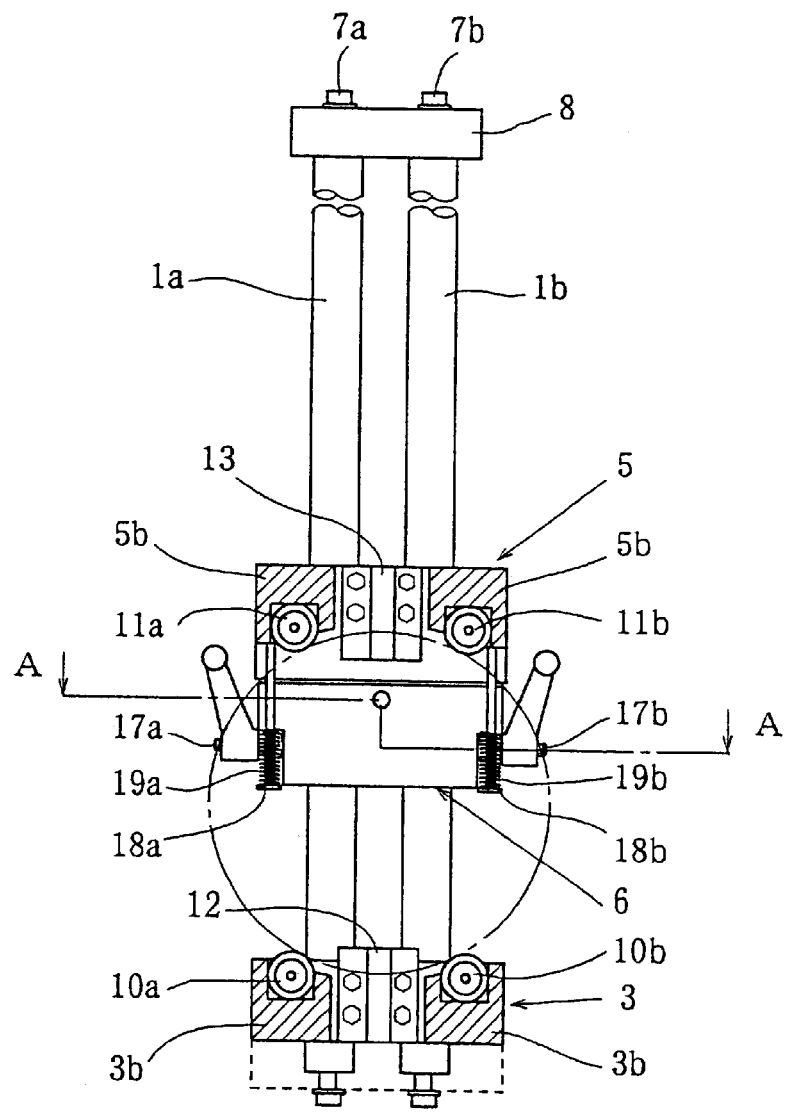
FIG. 2 is an illustrative drawing of a mechanism for holding a measured object of an apparatus according to the present invention. FIG.(a) is a partially sectioned front view, and FIG.(b) is a sectional view taken along line A—A in FIG. (a).
Figure 2B:
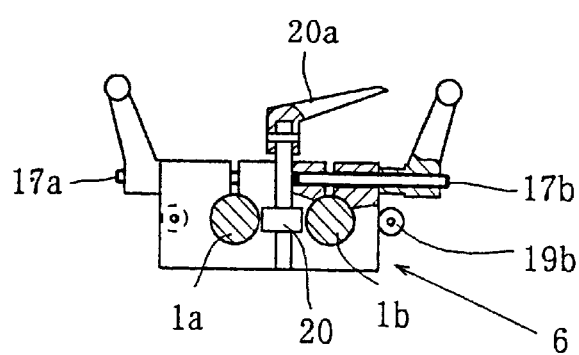
Figures 3A, 3B:
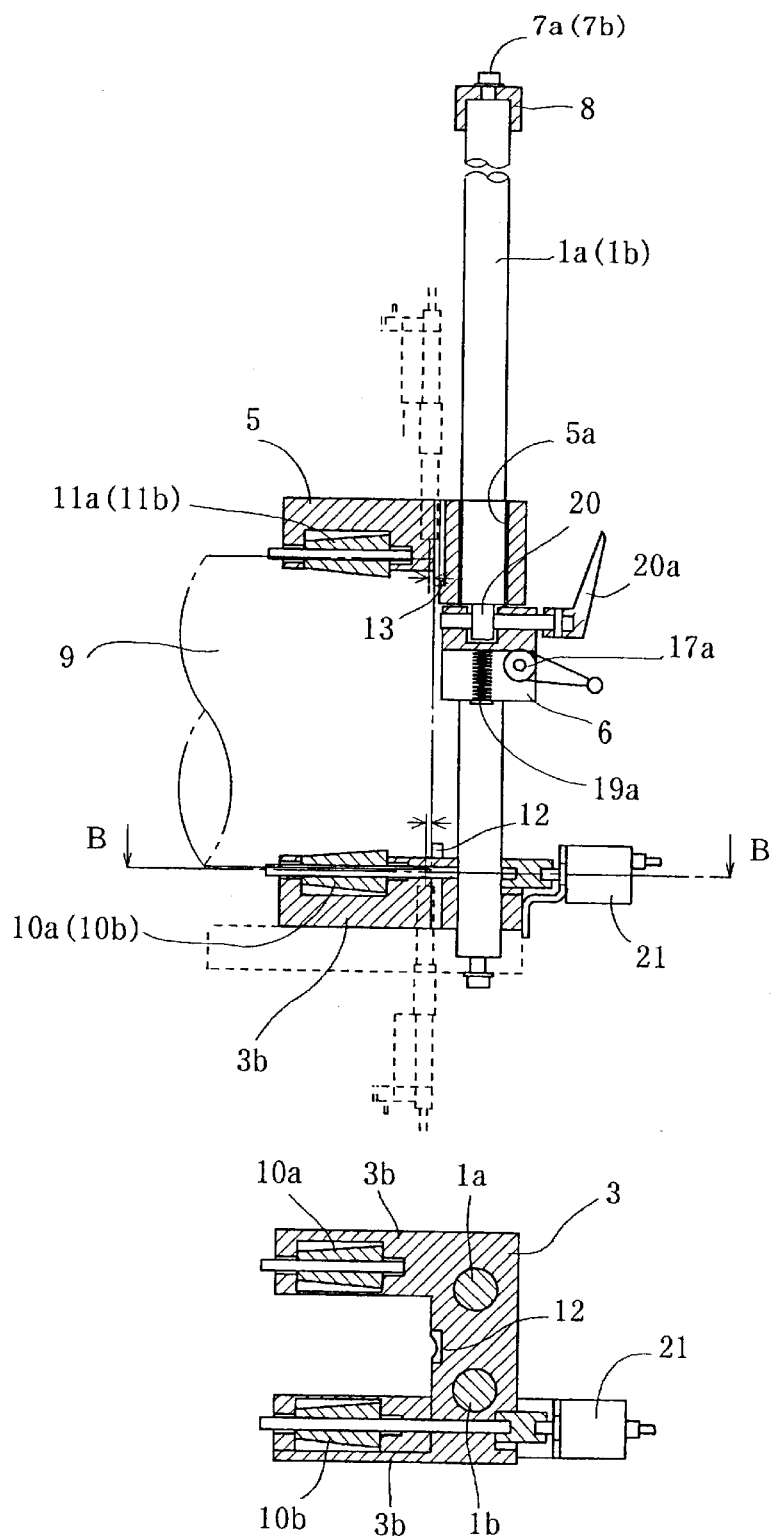
FIG. 3 is an illustrative drawing of a mechanism for holding a measured object of an apparatus, according to the present invention. FIG. (a) is a partially sectioned front view, and FIG. (b) is a sectional view taken along line B—B in FIG. (a).

FIG. 2 and FIG. 3 are drawings, which are extracted from the apparatus shown in FIG. 1, in order to describe a mechanism for holding a measured object. As shown in the figures, the position-fixing bracket 6 is provided with pins 18a and 18b, which penetrate the position-fixing bracket, and then are screwed into the presser roller arm 5. Coil springs 19a and 19b are provided between each enlarged end of these pins and the position-fixing bracket 6. These pins have a function for pulling the position-fixing bracket 6 and the presser roller arm 5 in the direction of making them closer to each other and integrating them.

A separating mechanism is provided between the position-fixing bracket 6 and the presser roller arm 5 in order to separate them against the pulling force of the coil springs 19a and 19b. In this separating mechanism a roller 20, having oval shape in front view, is installed in a recess formed by the position-fixing bracket 6 and the presser roller frame 5, and this roller is rotated with a predetermined angle by a handle 20a.

A rotary encoder 21 is attached on one end of the bearing roller 10b. This enables a rotation of the bearing roller 10b to be converted into an electric signal for detecting a turnover number of the bearing roller 10b. The electric signal is transmitted to an arithmetic unit (not shown) in order to carry out an operation to calculate a circumferential position of the measured object 9.

FIG. 4 is a drawing describing the measuring mechanism of the apparatus shown in FIG. 1. Air pipes 22a, 22b, 23a and 23b are respectively attached to gauge heads 14a, 14b, 15a and 15b. An in-and-out movement (vertical movement) of the gauge heads is caused from compressed air, which is supplied through these air pipes, and the in-and-out movement is then converted into electric signals to be outputted from terminals 24a, 24b, 25a and 25b. The signals are then processed by means of an arithmetic unit (not shown).

The gauge head 14a is attached to the gauge head support arm 2 by retention fittings 26a and 26b, while the gauge head 15b is attached to the gauge head support arm 4 by retention fittings 27a and 27b. A moving distance of the gauge head 15b is determined by a scale 28. Another scale is also provided for checking the movement distance of the gauge head 14b, but this does not appear in the drawings.

Figure 4C:
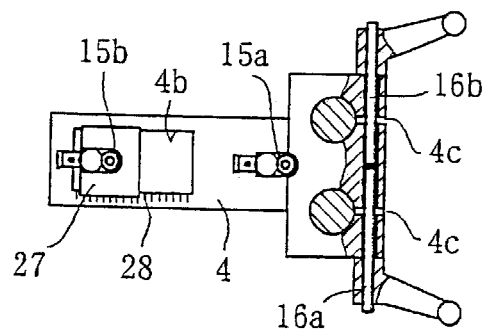
Figure 5A:
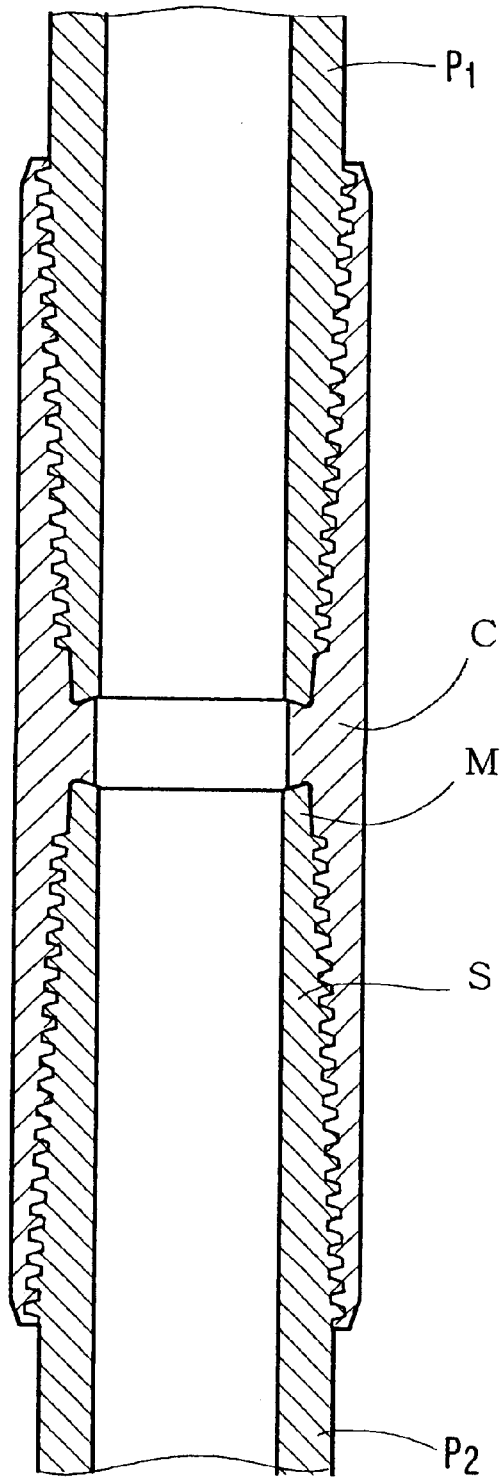
FIG. 5 is a sectional view showing a method for coupling oil well pipes. FIG. (a) shows a type in which the pipes are joined by use of a coupler, and FIG.(b) shows a type in which the pipes are directly joined.
Figure 5B:
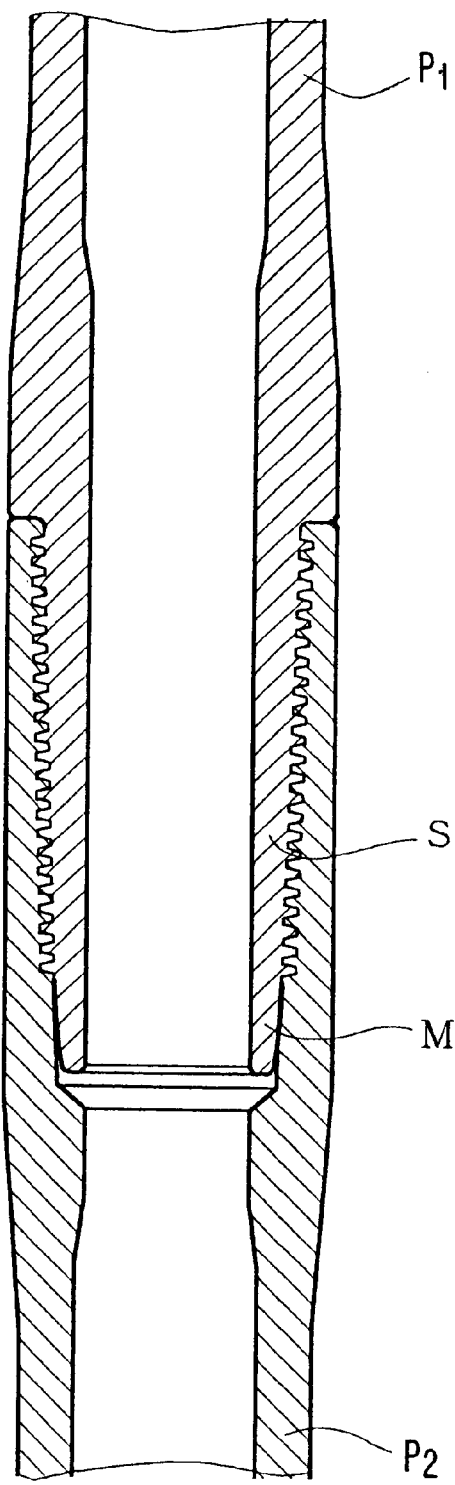

A mechanism for attaching slidably the upper gauge head support arm 4 to the main arm 1 is as shown in FIG. 4(C). That is, the slide of the arm 4 becomes possible by way of turning screws 16a and 16b in a direction, which causes a slit 4c to be opened. When turning them in the contrariwise direction, which causes a slit 4c to close, the arm 4 is locked. The position-fixing bracket 6, described above, is attached to the main arm 1 with the similar mechanism.

2. An Outer Diameter Measuring Method Using an Apparatus According to the Present Invention The outer diameter measurement is carried out under the following steps.

(1) First, loosening the screws 16a, 16b, 17a and 17b, making the gauge head support arm 4 and the position-fixing bracket 6 slide vertically along the main arm which enables a measured object (a pipe) 9 to be received therein.

(2) Then, inserting the measured object 9 between the gauge heads 14a, 15a, 14b and 15b, making the end of the measured object contact to the reference piece 12.

(3) Thereafter, sliding the position-fixing bracket 6 toward the bearing roller arm 3 (downward) while separating the presser roller arm 5 from the position-fixing bracket 6, that is, with pushing the presser roller arm upward against the coil springs 19a and 19b, by turning the handle 20a, wherein the presser roller arm 5 is slid toward the bearing roller arm 3 therewith. Then, tightening the screws 17a and 17b at the position, in which the presser rollers 11a and 11b contact to the measured object 9, in order to position the position-fixing bracket 6.

(4) Then, sliding the upper gauge head support arm 4 downward, and tightening the screws 16a and 16b at a position, in which the gauge head 15a contacts to an outer peripheral surface of an end portion of the measured object 9, in order to position the arm 4. Then, in this condition, replacing the handle 20b, wherein the measured object 9 is held firmly with the presser rollers 11a and 11b and the earing rollers 10a and 10b, by the action of the cold springs 19a and 19b.

(5) Making the gauge heads 14b and 15b move to bring a position of paired measuring heads 14b and 15b into line with a designated measuring position of the measured object 9, with keeping the above condition, and then positioning it. Then, supplying a compressed air to the air pipes 22a, 22b, 23a and 23b so as to make the gauge heads 14a, 14b, 15a and 15b contact to the outer peripheral surface of the measured object with constant pressure.

Hereat, a zero-point of the measuring head is previously calibrated by such as a reference block gauge, having the same shape as the measured object. Thus, comparing the position where each measuring head makes contact with the measured object, by the aforementioned operation step (5) with the zero-point, and picking up an amount of displacement in the form of an electric signal from the terminals 24a, 24b, 25a and 25b, in order to calculate an outer diameter of the measured object.

(6) Then, fixing either the measuring apparatus or the measured object 9, and turning the other one with a predetermined angle so as to measure an outer diameter at a different circumferential position. When a rotary encoder is attached to the apparatus, this measuring position can be detected with high accuracy. In the example shown in the drawing, picking up the rotation of the bearing roller 10b, in the form of an electric signal by the rotary encoder 21, and transmitting the signal to the arithmetic unit, in order to calculate a circumferential position of the measured object, corresponding to the measured portion. Subsequently, making the gauge heads contact to the outer peripheral surface of the measured object 9, for each circumferential position of the measured object 9, in order to measure the outer diameter of the measured object 9.

In the apparatus shown in the drawing, the gauge heads 14a and 15a, positioned near by the main arm 1, are respectively secured to the lower gauge head supporting arm 2 and the upper gauge head supporting arm 4. Because, in the end worked portion of an oil well pipe, a measuring point close to the end of a pipe, i.e., a measuring point in a metal seal portion (distance from a pipe edge) is generally constant regardless of the pipe size, as previously described. However, these gauge heads may be adapted to be movable to the reference pieces 12 and 13, the same as other gauge heads 14b and 15b.

As described above, for the end worked portion of an oil well pipe having no metal seal portion, an outer diameter measurement may be carried out only for one portion at a certain distance from the pipe end. Therefore, when measuring such a pipe, it is not necessary to operate the gauge head 14a and 15a. Even where a longitudinal position of a pipe, at which an outer diameter is measured, is either one portion or two portions, an apparatus according to the present invention can be used in a similar manner.

Industrial Applicability

A measuring apparatus of the present invention has various advantages as cited hereinafter.

1. The apparatus can cope with measurements of various pipes having different outer diameters.

2. The apparatus enables to simultaneously measure the outer diameters of two portions at different distances from a pipe end. Besides, a measurement at a number of circumferential portions or over circumference can continuously be carried out.

3. During the measurement, since a pipe is surely held by the bearing rollers and the presser rollers, a relationship in position between the gauge head an the pipe is constant at all times. Therefore, measurement errors caused in manual operation do not occur.

4. Since the measurement is performed by way of contact of the gauge heads, there is no possibility to make a defect on the measured object.

5. Since measurement results are picked up in the form of electric signals, treatment and recording of the results can automatically be carried out.

By using the apparatus of the present invention having the aforementioned advantages, an outer diameter measurement of a worked pipe edge can rapidly be carried out with accuracy.

What is claimed is:

1. An apparatus for measuring an outer diameter of a pipe end, comprising:

a main arm;

a lower gauge head support arm, a bearing roller arm, a presser roller arm and an upper gauge head support arm, each of which is projected at a right angle from said main arm; and a position-fixing bracket for positioning said presser roller arm;

wherein said presser roller arm, said upper gauge bead support arm and said position-fixing bracket are slidable along said main arm and fixable at a predetermined position;

said bearing roller arm includes a pair of first rollers and said presser roller arm includes a second pair of rollers, said first and second pair of rollers rotatably support said pipe;

said upper gauge head support arm includes a first pair of gauge heads, one of which is movable toward said main arm and the other is movable toward said main arm or is fixable at a predetermined position; and said lower gauge head support arm includes a second pair of gauge heads, one of which is movable toward said main arm, and the other which is movable toward said main arm or is fixable at a predetermined position.

2. An apparatus for measuring an outer diameter according to claim 1, which further includes a device for detecting a turnover number of at least one of said rollers installed on said bearing roller arm and on said presser roller arm.

3. A method of measuring an outer diameter of a pipe end using said apparatus according to claim 1, comprising the steps of:

making one of said first pair of gauge heads supported by the upper gauge head support arm and one of said second pair of gauge heads supported by the lower gauge head support arm contact to an outer peripheral surface of the pipe end, while holding a pipe between said bearing roller arm and said presser roller arm;

picking up a movement distance of said gauge head at said previous step in the form of an electric signal; and calculating the outer diameter of said pipe end object from said electric signal.

4. A method of measuring a threaded pipe end of an oil well pipe using said apparatus according to claim 1, comprising the steps of:

making one of said first pair of gauge heads supported by the upper gauge head support arm and one of said second pair of gauge heads supported by the lower gauge head support arm contact to an outer peripheral surface of said oil well pipe, while holding said oil well pipe between said bearing roller arm and said presser roller arm;

picking up the movement distance of said gauge heads of said previous step in the form of an electric signal; and calculating an outer diameter of at least one of a longitudinal pipe edge of said oil well pipe from said electric signal.

5. An apparatus for measuring an outer diameter of an object, comprising:

a main arm;

a bearing roller arm disposed on said main arm at an angle perpendicular to said main arm and movable thereon;

a presser roller arm disposed on said main arm at an angle perpendicular to said main arm and including rollers and movable thereon, said bearing roller arm and said presser roller arm each including rollers for rotatably supporting said object;

a position-fixing bracket for positioning said presser roller arm;

a lower gauge head support arm supporting a first gauge head and a second gauge head;

an upper gauge head support arm supporting a first gauge head and a second gauge head, each of said upper and lower gauge head support arms being projected at a right angle from said main arm;

wherein at least one of said gauge heads supported by said upper gauge head support anus and at least one of said gauge heads supported by said lower gauge head support arm being movable toward said main arm and fixable at a predetermined position.

6. The apparatus of claim 5, further comprising:

a rotary encoder for measuring the angular rotation of at least one of said rollers of said bearing roller arm and on said presser roller arm.

7. The apparatus of claim 5, wherein said bearing roller arm and presser roller arm are vertically slidable along said main arm.

8. The apparatus of claim 5, wherein said bearing roller arm is U-shaped and said rollers of said bearing roller arm are rotatably attached to opposing sides of said bearing roller arm.

9. The apparatus of claim 5, wherein said presser roller arm is U-shaped and said rollers of said presser roller arm are rotatably attached to opposing sides of said presser roller arm.

10. The apparatus of claim 5, wherein said lower gauge head support arm and bearing roller arm are disposed horizontally at a lower end portion of said main arm.

11. The apparatus of claim 10, wherein said upper gauge head support arm and presser roller arm are disposed horizontally at an upper end portion of said main arm.

* * * * *